UNITED STATES PATENT OFFICE.

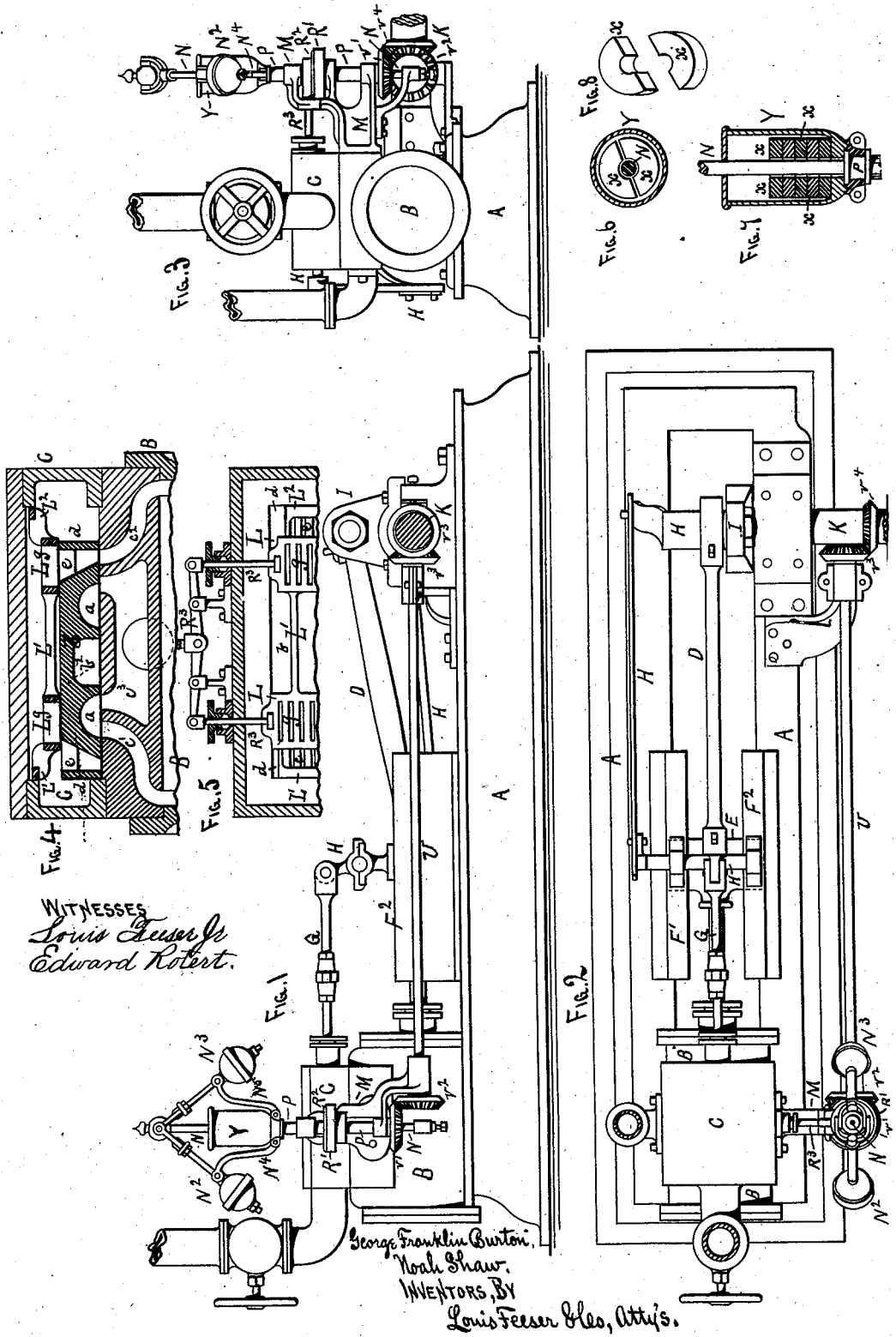

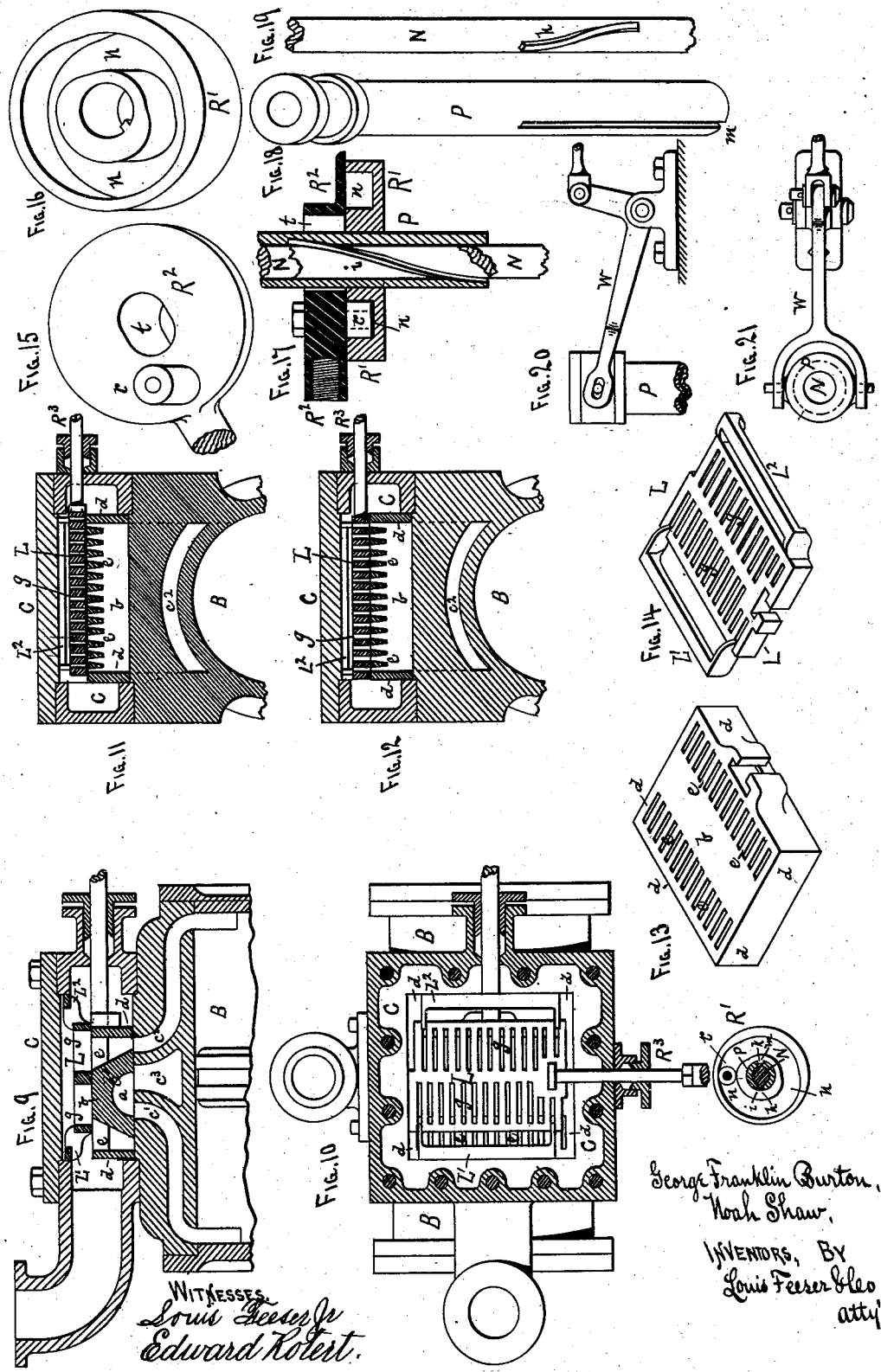

GEORGE F. BURTON AND NOAH SHAW, OF EAU CLAIRE, WISCONSIN.

CUT-OFF VALVE AND GEAR.

SPECIFICATION forming part of Letters Patent No. 259,747, dated June 20, 1882.

Application filed September 27, 1881. (No model.)

*To all whom it may concern:*

Be it known that we, GEORGE FRANKLIN BURTON and NOAH SHAW, both citizens of the United States, and both residents of Eau Claire, in the county of Eau Claire and State of Wisconsin, have made certain new and useful Improvements in Cut-Off Valves and Gear for Steam-Engines, of which the following is a specification.

This invention relates to cut-off valves of steam-engines, and in connection with which certain novel constructions of valve-gear, comprising either a governor or hand mechanism, by which the cut-off valves are controlled, are shown, but which will form the subject-matter of claim under another application; and it consists in the combination, with the governor and intermediate mechanism, of an auxiliary valve, which is prevented from moving longitudinally with the ordinary slide-valve, while it is adapted to be moved back and forth upon said ordinary slide-valve, in a transverse direction thereto, by said intermediate mechanism, whereby the regulation of the supply of steam by the governor-balls or other means employed for controlling the speed can be more effectively utilized for hastening or retarding the vibratory motion of the auxiliary valve, which regulates or equalizes the supply of steam; and, further, in a novel combination of the main valve, auxiliary or cut-off valve, guides, steam-chest, stem, slotted disk, pin or friction roller, cam-drum, shaft carrying a sleeve, and shaft with gears, as will be hereinafter described and specifically claimed.

Prior to our invention a cut-off valve has been made to slide crosswise of the main slide-valve between ribs or flanges on each end of the said slide-valve, and this cut-off valve, while capable of moving transversely, also moves lengthwise of the cylinder with the main valve, and hence the actuating-cam of the cut-off valve is compelled to move said cut-off valve from a dead-stop and against the steam-pressure upon it, and, owing to this, the auxiliary valve moves hard, so much so that the action of the governor cannot be as perfect as is desired. Our improvement of having the main valve always to move free of the auxiliary valve, and of keeping the auxiliary valve stationary lengthwise of the cylinder and while the main valve is moving, and of having the auxiliary valve only capable of being moved transversely when the cut-off cam is acting upon it, insures an easy movement of the cut-off. Our cut-off valve being fitted to slide between end flanges of the steam-chest, or between cheeks that are fastened to the steam-chest or its cover, all motion of this valve lengthwise of the cylinder is avoided, while at the same time the main valve is allowed to move under the cut-off valve far enough to allow the steam to circulate under the cut-off valve, and relieve it of steam-pressure before the cam moves it. In a word, our cut-off valve only moves in one direction—viz., transversely or at right angles to the main valves—and this fact, in connection with the fact that the main valve moves free of it, and moves so as to relieve the cut-off valve of pressure when the time arrives for it to be moved to cut off or regulate the cut-off steam, is of great importance, as the most accurate regulation by the governor-balls, the intermediate mechanism, and the auxiliary valve can be effected.

We attain the objects of our invention by the use of the mechanism illustrated in the accompanying drawings, in which Figure 1 is a side elevation. Fig. 2 is a plan view, and Fig. 3 is a rear elevation, of an engine complete, showing our improvements attached thereto. Fig. 4 is a sectional side elevation, and Fig. 5 is a sectional plan view enlarged, of a portion of the steam-chest cylinder and valves, showing a variation in the manner of constructing them. Fig. 6 is a sectional plan view, and Fig. 7 is a a cross-sectional elevation, of the weight-box of the governor detached and enlarged. Fig. 8 is a perspective view of a pair of the weights detached. Fig. 9 is a sectional side view, and Fig. 10 is a sectional plan view enlarged, of the steam-chest, valves, and cylinder, illustrating the details of construction shown in Figs. 1, 2, and 3; Figs. 11 and 12, cross-sectional views of Figs. 9 and 10, showing the two extreme positions of the auxiliary valve; Figs. 13 and 14, detached perspective views of the slide-valve and auxiliary valve. Fig. 15 is an enlarged reversed perspective view of the cover and friction-roller, and Fig. 16 a perspective view of the auxiliary valve-operating cam. Fig. 17 is a cross-sectional view of the auxiliary valve-operating mechanism. Fig. 18 is a perspective view of the grooved sleeve, by which the motion of the governor is imparted to the cam and auxiliary valve; and Fig. 19 is a perspective view of a portion of the governor and cam-operating shaft detached, showing the spiral rib or feather thereon. Figs. 20 and 21 show a variation in the manner of operating the sleeve to enable the cut-off to be regulated by a hand-lever.

A is the bed or frame; B, the cylinder; C, the steam-chest; D, the connecting-rod; E, the cross-head; $F'$ $F^2$, the slides; G, the valve-stem; H, the valve-operating mechanism; I, the crank, and K the main shaft, all arranged in the ordinary manner.

The slide-valve $b$ consists of the ordinary exhaust-port, $a$, with the arched covering $b'$, adapted to be moved back and forth over the steam and exhaust ports $c'$ $c^2$ $c^3$ by the stem G; but, in addition thereto, walls $d$ are formed around each side and connected to the center arch by small ribs or slats $e$, at equal distances apart, so that all the steam must pass to the cylinder through the passages between these slats.

Above the valve $b$ another valve, L, is seated and provided with two rows of slats, $g$, corresponding to the slats $e$, except that the slats of one side are opposite the spaces of the other side, so that when the valve L is so placed upon the valve $b$ that the slats $g$ of one side will be opposite the corresponding slats, $e$, of the valve $b$, the slats $g$ of the opposite side of the valve L will be opposite the spaces between the slats $e$ on the corresponding side of the valve $b$, thus forming a free passage of the steam to the cylinder through the spaces between the slats, $e$ $g$, on one side, but shutting it entirely off on the other side, and then, when the position of the valve L is reversed, the steam will be admitted on the opposite side and shut off from the formerly-open side, as hereinafter more fully explained.

M is a hanger or frame attached to the side of the cylinder, and carrying an upright shaft, N, surrounded by a hollow sleeve, P. Upon this shaft N is a spiral feather or rib, $h$, (see Fig. 19,) adapted to fit into a corresponding but longer spiral groove, $i$, in the sleeve P, (see Fig. 17,) so that the latter may be revolved with the shaft, as hereinafter shown.

$R'$ is a wheel or drum surrounding the sleeve P, opposite the central line of the valve L, and adapted to be revolved with the sleeve by a feather, $k$, and groove $m$, so that the sleeve may be raised and lowered while revolving the drum. In the upper face of the drum $R'$ a cam-groove, $n$, is formed, with about one-half ($\frac{1}{2}$) its length the segment of a circle of a smaller radius than the remainder, so that a roller, $r$, upon a disk or cover, $R^2$, projecting down into this cam-groove will be moved outward and held outward during one-half ($\frac{1}{2}$) the revolution of the drum, and then moved inward and held inward during the remainder of the revolution. The cover $R^2$ is formed with a slot, $t$, where it surrounds the sleeve P, and is connected by a stem, $R^3$, to the valve L. By this arrangement the revolution of the drum $R'$ will, through its cam-groove, act upon the valve L to move it back and forth once during each revolution at right angles to the movement of the valve $b$.

$L'$ $L^2$ are guides attached to the side of the valve L, and adapted to fit between the upper edges of the flanges of the steam-chest to act as guides to cause the valve to move in a parallel line at all times. The guides $L'$ $L^2$ prevent the auxiliary valve L from moving lengthwise of the cylinder, while the main valve, which is always in motion and is attached to the stem G, is free to move under the auxiliary valve, and by thus moving it will relieve the auxiliary valve of steam-pressure while said auxiliary valve is being moved by the cam, as herein described.

The lower end of the shaft N is stepped in a bracket upon the hanger M, and provided with a miter-gear, $v'$, adapted to mesh into a similar gear, $v^2$, upon a horizontal shaft, U. On the opposite end of this shaft U a third miter-gear, $v^3$, is mounted and adapted to mesh into a fourth gear, $v^4$, upon the main shaft K, whereby the necessary motion is imparted to the shaft N. The gears $v'$ $v^2$ $v^3$ $v^4$ being all the same size, the motion of the valve L will correspond with the motion of the engine, and by being connected directly to the main shaft K through said gears its motion is positive.

The stem $R^3$ is adapted to be adjusted so that the auxiliary valve may be set to the desired point.

To the upper part of the shaft N a pair of governor-balls, $N^2$ $N^3$, are pivoted in the usual manner, and connected by arms $N^4$ $N^5$ to a collar, $N^6$, on the upper part of the sleeve P, so that the raising and lowering of the balls will raise and lower the sleeve.

The operation is as follows: The valve L will be set to cut off at the proper point to adapt the engine to the work it is required to perform, and the governor-balls adjusted to hold the sleeve at about a medium position when the engine is running at the speed it is desired it should maintain, so that the spiral rib $h$ is about midway of the spiral groove $i$. The engine is then set in motion, and as long as it maintains its regular speed the governor-balls will remain stationary and hold the sleeve P stationary, so that the cam $R'$ will be revolved regularly and operate the valve L regularly, and thus cut off the steam at the same point of each stroke; but should the supply of steam or the speed of the engine be increased the governor-balls would be raised and carry the sleeve P with them, and thus cause the spiral groove $i$, through rib $h$, to revolve the sleeve, and with it the cam-drum $R'$, a little quicker than the motion of the shaft N, and thus move the valve L ahead a little faster and cut off the steam earlier in the stroke, and thus reduce the speed by reducing the supply of steam. Should, however, the supply of steam or the speed of the engine be decreased by any means, the governor-balls would fall and carry the sleeve P with them, and thus retard the forward movement of the drum R' and hold the valve L back a little to permit the cylinder to take steam at a longer period of the stroke, and thus increase the speed by increasing the supply of steam. By this means the cut-off valve L is perfectly controlled by the govenor, and the slightest possible change of speed is at once communicated to the delicately-poised governor-balls, and immediately regulated by them.

By our arrangement only just steam enough to supply the engine and keep it running at a uniform speed is used.

In locomotives, marine and other engines, in which reversing mechanism is required, the governor will be dispensed with, and a hand-lever, w, (see Figs. 20 and 21,) attached to the sleeve P to raise and lower it to alter the cut-off by hand. In this arrangement the cam-groove and rib $ih$ will be formed to completely encircle the shaft N and sleeve P, so that the cam-drum may be revolved one complete revolution, whereby the position of the valve L may be reversed with the valve $a\,b$, and thus secure the reversion of the engine, and the lever $w$ will be arranged to move the sleeve P up and down above the center of the spiral groove when the engine is moving in one direction, and move the sleeve P up and down below the center when the engine is reversed, to insure the proper working of the cut-off valve.

Figs. 4 and 5 illustrate the manner of applying our improved valve to an engine with the ports at the ends of the cylinder; but the action and construction are substantially the same, the valve L being made with a larger distance between the two sets of slats $g$.

The two sets of slats may be connected by bars L', cast in one piece therewith, or by bolts or tie-rods, or in any other suitable manner, and the valve $b$ may be made in one or more parts or cast in one piece, as shown.

Surrounding the shaft N above and resting loosely upon the upper end of the sleeve P is a hollow circular drum, Y, in which semicircular weights $x$ are placed. By this means the governor may be weighted when an increased speed is desired, as the more weights that are placed on the governor the greater will be the speed required to raise the balls. Hence a greater speed of the engine will be gained before the governor-balls raise the sleeve and cut off the steam. Thus by increasing or decreasing the weights the governor may be made to act quickly or slowly, and the desired rate of speed increased or decreased.

We are aware of the German Patent No. 9,587 for 1879, and while this patent shows an auxiliary valve which is guided and moves transversely to the main valve it differs from our invention in this: All of the passages between the slats are in line, and not alternated, as in our valve.

We are also aware of English Patent No. 884 for 1875, and while this patent shows an auxiliary valve which has its passages alternated and in line it differs from our invention in not having guides, which prevent it from moving longitudinally with the main valve. The combination of the alternated passages and the guides, as shown in our application, produces a very important and useful result, as has hereinbefore been set forth—the immediate letting on of the steam at one end simultaneously with the cutting off the steam at the other end, and this with an action which is gradual—that is, as is the diminishment of the width of the passages at one end an equal extent of opening at the other end is effected, and thus the action of the cut-off is rendered more instantaneous than when the passages are all in line, and the cut-off valve, owing to being guided and to having the slats $g\,g$ arranged out of line or to alternately correspond, as shown, can be moved without being subjected to a full pressure of steam upon it.

What we claim as new is—

1. The combination, with the valve $b$, provided with slats $e\,e$, which are in line with one another, of the auxiliary valve L, provided with slats $g\,g$, which are out of line with one another, and alternately correspond with the slats $e\,e$ and with guides L' L², which hold it from moving lengthwise of the cylinder and with the main valve, while it is caused to move transversely upon said main valve, substantially as and for the purpose described.

2. The combination, with the valve $b$, provided with slats $e\,e$, which are in line with one another, of the auxiliary valve L, provided with slats $g\,g$, which are out of line with one another, and alternately correspond with the slats $e\,e$ and with guides L' L², mechanism by which the valve L is operated, and the governor, substantially as and for the purpose described.

3. The combination of the valve $b$, having slats $e\,e$, the valve L, having slats $g\,g$, and guides L' L², steam-chest, stem R³, slotted disk R², pin or roller $r$, cam-drum R', shaft N, sleeve P, gears $v'\,v^2\,v^3\,v^4$, and shaft K, substantially as and for the purpose described.

In testimony whereof we have hereunto set our hands in the presence of two subscribing witnesses.

GEORGE FRANKLIN BURTON.
NOAH SHAW.

Witnesses:
 IRVING D. HULL,
 GEO. B. SHAW.